US012203387B2

(12) United States Patent
Lucking et al.

(10) Patent No.: US 12,203,387 B2
(45) Date of Patent: Jan. 21, 2025

(54) THERMAL PROFILE BASED REDIRECTION OF TURBINE SYSTEM COMPONENT COOLANT BY TARGETED ALTERATION OF COOLING PASSAGE EXIT OPENING CROSS-SECTIONAL AREA

(71) Applicant: GE Infrastructure Technology, LLC, Greenville, SC (US)

(72) Inventors: Caitlin Shea Lucking, Mauldin, SC (US); Patrick Yerkes, Greenville, SC (US); Daniel J. Dorriety, Travelers Rest, SC (US); Stanley Frank Simpson, Simpsonville, SC (US); Kyle J. Lewis, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/376,977

(22) Filed: Oct. 5, 2023

(65) Prior Publication Data

US 2024/0026791 A1 Jan. 25, 2024

Related U.S. Application Data

(63) Continuation-in-part of application No. 17/657,420, filed on Mar. 31, 2022, now Pat. No. 11,859,512.

(51) Int. Cl.
*F01D 5/18* (2006.01)
*F01D 25/12* (2006.01)

(52) U.S. Cl.
CPC ............... *F01D 5/18* (2013.01); *F01D 25/12* (2013.01); *F05D 2220/30* (2013.01); (Continued)

(58) Field of Classification Search
CPC ............. F01D 5/187; F05D 2260/2212; F05D 2260/22141
See application file for complete search history.

(56) References Cited

U.S. PATENT DOCUMENTS 4,185,369 A 1/1980 Darrow et al.
4,249,291 A 2/1981 Grondahl et al.
(Continued)

FOREIGN PATENT DOCUMENTS

EP 1147849 A1 10/2001
EP 2230384 A2 9/2010
(Continued)

OTHER PUBLICATIONS

Non Final Office Action mailed Feb. 2, 2023 for U.S. Appl. No. 17/657,420, filed Mar. 31, 2022; pp. 14.
(Continued)

*Primary Examiner* — Eldon T Brockman
(74) *Attorney, Agent, or Firm* — James Pemrick; Charlotte Wilson; Hoffman Warnick LLC

(57) ABSTRACT

A method for redirection of coolant flow is provided. The method includes an identifying step that identifies a hot spot on an exterior surface of a body of a component of a turbine system. A first parameter of the component indicates that a temperature of the exterior surface in the hot spot exceeds a threshold value. Another identifying step identifies a cool spot on the exterior surface. A second parameter of the component indicates that the temperature of the exterior surface in the cool spot is below the threshold value. A reconfiguring step reconfigures a plurality of cooling passages of the component to direct a portion of a coolant from the cool spot to the hot spot.

15 Claims, 12 Drawing Sheets

(52) U.S. Cl.
CPC ...... *F05D 2240/30* (2013.01); *F05D 2260/20* (2013.01); *F05D 2260/81* (2013.01)

(56) References Cited

U.S. PATENT DOCUMENTS

| | | | | |
|---|---|---|---|---|
| 4,953,777 | A | 9/1990 | Griffith et al. | |
| 6,370,752 | B1 | 4/2002 | Anderson et al. | |
| 7,219,043 | B2 * | 5/2007 | Rebello | G05B 19/4097 700/182 |
| 7,273,351 | B2 * | 9/2007 | Kopmels | F01D 5/186 416/97 R |
| 8,052,378 | B2 * | 11/2011 | Draper | F01D 5/186 415/121.2 |
| 9,353,687 | B1 | 5/2016 | Brostmeyer et al. | |
| 9,624,779 | B2 | 4/2017 | Schick et al. | |
| 10,006,293 | B1 | 6/2018 | Jones | |
| 11,286,792 | B2 | 3/2022 | Razzell et al. | |
| 2003/0149498 | A1 * | 8/2003 | Rebello | G05B 19/4097 700/104 |
| 2006/0099074 | A1 * | 5/2006 | Kopmels | F01D 5/186 416/97 R |
| 2007/0036942 | A1 | 2/2007 | Steele | |
| 2010/0239409 | A1 | 9/2010 | Draper | |
| 2010/0239412 | A1 * | 9/2010 | Draper | F01D 5/186 415/115 |
| 2014/0271131 | A1 | 9/2014 | Moody et al. | |
| 2015/0104322 | A1 | 4/2015 | Schick et al. | |
| 2018/0051567 | A1 | 2/2018 | Bunker | |
| 2021/0032995 | A1 | 2/2021 | Razzell et al. | |

FOREIGN PATENT DOCUMENTS

| | | | |
|---|---|---|---|
| EP | 3179043 | A1 | 6/2017 |
| EP | 3351730 | A1 | 7/2018 |

OTHER PUBLICATIONS

European Search Report completed May 23, 2023 for Application No. 23161411.6; pp. 9.

Final Office Action mailed Aug. 21, 2023 for U.S. Appl. No. 17/657,420, filed Mar. 31, 2022; pp. 13.

Notice of Allowance mailed Sep. 20, 2023 or U.S. Appl. No. 17/657,420, filed Mar. 31, 2022; pp. 5.

* cited by examiner

THERMAL PROFILE BASED REDIRECTION OF TURBINE SYSTEM COMPONENT COOLANT BY TARGETED ALTERATION OF COOLING PASSAGE EXIT OPENING CROSS-SECTIONAL AREA

TECHNICAL FIELD

The disclosure relates generally to turbine system components, and more particularly, to targeting coolant flow redirection based on a thermal profile, such as a cooling profile, of a component, such as by reducing a cross-sectional area of a cooling passage of the component that has excess cooling capability.

BACKGROUND

Turbine system components oftentimes include cooling passages that deliver a coolant through the body of the component to cool it during use in a hot environment such as in a gas or steam turbine. The cooling passages exit an exterior surface of the body at an exit opening.

Turbine system components can have localized hot spots or cold spots as a result of thermal loading and/or operation with parameters other than those used in component design. This can result in repeatable damage modes, which can be observed visually, measured, and/or predicted through use of thermal/mechanical modeling. Without alteration of the component, such as its cooling system, damage modes can recur and require additional repair. Such damage modes can be exacerbated when the system in which the component is installed is operated farther from design parameters (so-called “over-firing” or “peaking”), which can result in increased transients, cycling, temperatures, and other more extreme parameter values. This can lead to further increased repair costs, the need for more robust repair capability, or even scrapping of components when repair is infeasible.

Even when a system is operated within design parameters, thermal and mechanical analysis occasionally underpredicts damage modes, and repair processes must react to new or heavier-than-expected damage. Modifications can be introduced to combat this, but can be challenging to execute when they involve changing the allocation of cooling airflow. One method used to reallocate cooling airflow is to adjust the size of cooling passage exit openings.

Adjustment of the size of the exit opening of a cooling passage can change the amount of coolant passing therethrough, and the amount of cooling provided by the cooling passage. The current process for changing the exit opening size includes completely filling the exit opening of the cooling passage and re-opening the exit opening with a different size opening. The process to fill each exit opening and then individually re-open each exit opening, e.g., using drilling, is time consuming and tedious and is related to poor quality outcomes.

BRIEF DESCRIPTION

All aspects, examples and features mentioned below can be combined in any technically possible way.

An aspect of the disclosure provides a method, comprising identifying a hot spot on an exterior surface of a body of a component of a turbine system, wherein a first parameter of the component indicates that a temperature of the exterior surface in the hot spot exceeds a first threshold value; identifying a cool spot on the exterior surface, wherein a second parameter of the component indicates that the temperature of the exterior surface in the cool spot is below a second threshold value; and reconfiguring a plurality of cooling passages to direct a portion of a coolant from the cool spot to the hot spot.

Another aspect of the disclosure includes any of the preceding aspects, and the exterior surface includes the plurality of cooling passages extending thereto, each cooling passage having a first cross-sectional area and a first exit opening in the exterior surface, and wherein the redirecting coolant includes altering a cross-sectional area of a cool spot cooling passage in the cool spot to have a second cross-sectional area that is smaller than the first cross-sectional area.

Another aspect of the disclosure includes any of the preceding aspects, and altering the cross-sectional area of the cool spot cooling passage includes inserting a hollow member into the cool spot cooling passage, the hollow member having the second cross-sectional area, and coupling the hollow member into the cool spot cooling passage.

Another aspect of the disclosure includes any of the preceding aspects, and the hollow member defines a second exit opening in the exterior surface that has the second cross-sectional area.

Another aspect of the disclosure includes any of the preceding aspects, and the cool spot cooling passage includes a first group of the plurality of cooling passages, and altering the cross-sectional area of the cool spot cooling passage includes altering the cross-sectional area of each cool spot cooling passage of the first group according to a pattern.

Another aspect of the disclosure includes any of the preceding aspects, and identifying the hot spot includes measuring the first parameter of the component after operation of the turbine system.

Another aspect of the disclosure includes any of the preceding aspects, and identifying the cool spot includes using a cooling profile of the component.

Another aspect of the disclosure includes any of the preceding aspects, and the cooling profile is based at least in part on flow of coolant through the plurality of cooling passages.

Another aspect of the disclosure includes any of the preceding aspects, and identifying the cool spot includes identifying a cool spot cooling passage that has excess cooling capacity.

Another aspect of the disclosure provides a method, comprising identifying a first region of an exterior surface of a body of a component of a turbine system, wherein the first region requires more cooling than the first region currently receives, the first region including a first cooling passage of a plurality of cooling passages defined in a body of the component and extending to an exterior surface thereof, each cooling passage of the plurality of cooling passages having a first cross-sectional area and a first exit opening, and the first cooling passage requiring more cooling than the first cooling passage currently receives; identifying a second region of the exterior surface including a second cooling passage of the plurality of cooling passages that receives more cooling than the second cooling passage currently requires; and reconfiguring one or more of the first cooling passage and the second cooling passage to direct a portion of a coolant from the second cooling passage to the first cooling passage.

Another aspect of the disclosure includes any of the preceding aspects, and identifying the first region includes using a cooling profile of the component.

Another aspect of the disclosure includes any of the preceding aspects, and using a cooling profile of the component includes creating a cooling profile of the component.

Another aspect of the disclosure includes any of the preceding aspects, and the cooling profile is based on a parameter of the exterior surface after use of the component in the turbine system.

Another aspect of the disclosure includes any of the preceding aspects, and the parameter is oxidation of the exterior surface.

Another aspect of the disclosure includes any of the preceding aspects, and the parameter is creep.

Another aspect of the disclosure includes any of the preceding aspects, and the parameter is measured.

Another aspect of the disclosure includes any of the preceding aspects, and the parameter is predicted based on a digital model of the component.

Another aspect of the disclosure includes any of the preceding aspects, and the cooling profile is based on flow of a coolant through the plurality of cooling passages.

Another aspect of the disclosure includes any of the preceding aspects, and the reconfiguring includes reducing a cross-sectional area of the cool cooling passage.

Another aspect of the disclosure includes any of the preceding aspects, and reducing a cross-sectional area of the cool cooling passage includes inserting a hollow member into the cool cooling passage, the hollow member extending to the exterior surface of the body and defining a second exit opening therein, the second exit opening in the hollow member having a second cross-sectional area that is less than the first cross-sectional area.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
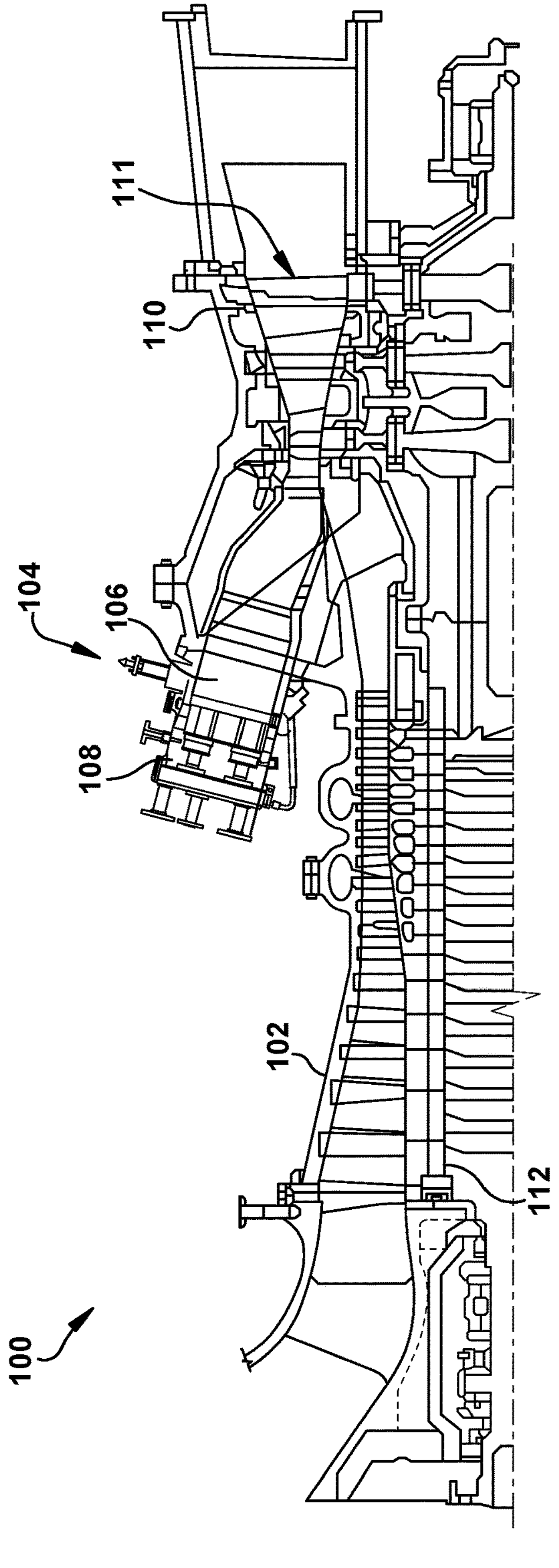
Fig. 1 (Prior Art)
FIG. 1 shows a schematic view of an illustrative turbomachine in the form of a gas turbine system.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within an illustrative industrial machine in the form of a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, “downstream” and “upstream” are terms that indicate a direction relative to the flow of a fluid, such as the working fluid through the turbine engine or, for example, the flow of air through the combustor or coolant through one of the turbine’s component systems. The term “downstream” corresponds to the direction of flow of the fluid, and the term “upstream” refers to the direction opposite to the flow (i.e., the direction from which the flow originates).

It is often required to describe parts that are disposed at differing radial positions with regard to a center axis. The term “radial” refers to movement or position perpendicular to an axis. For example, if a first component resides closer to the axis than a second component, it will be stated herein that the first component is “radially inward” or “inboard” of the second component. If, on the other hand, the first component resides further from the axis than the second component, it may be stated herein that the first component is “radially outward” or “outboard” of the second component. The term “axial” refers to movement or position parallel to an axis. Finally, the term “circumferential” refers to movement or position around an axis. It will be appreciated that such terms may be applied in relation to the center axis of the turbine.

In addition, several descriptive terms may be used regularly herein, as described below. The terms “first”, “second”, and “third” may be used interchangeably to distinguish one component from another and are not intended to signify location or importance of the individual components.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components but do not preclude the presence or addition of one or more other features, integers, steps, operations, elements, components, and/or groups thereof. “Optional” or “optionally” means that the subsequently described event or circumstance may or may not occur or that the subsequently described component or element may or may not be present, and that the description includes instances where the event occurs or the component is present and instances where it does not or is not present.

Where an element or layer is referred to as being “on,” “engaged to,” “connected to” or “coupled to” another element or layer, it may be directly on, engaged to, connected to, or coupled to the other element or layer, or intervening elements or layers may be present. In contrast, when an element is referred to as being “directly on,” “directly engaged to,” “directly connected to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

As indicated above, the disclosure provides a turbine system component. The turbine system component includes a body having an exterior surface, and a cooling passage defined in the body. The cooling passage may be a cooling passage as well as other flow metering passages, orifices or other similar elements of a gas turbine component that, when this process is applied, reduces the flow through that portion of the system. The cooling passage extends to an exterior surface of the body and has a first cross-sectional area. The turbine system component also includes a hollow member coupled in the cooling passage and defining a first exit opening at the exterior surface of the body. The first exit opening in the hollow member has a second cross-sectional area that is less than the first cross-sectional area, creating an exit opening with a smaller dimension than the original cooling passage. Coupling of the hollow member in one or more cooling passages according to embodiments of a method of the disclosure allows reduction in the cross-sectional area of the cooling passage at the exterior surface of the body, and reduces the cooling capabilities of the cooling passage. A thermal profile, such as a cooling profile, of the turbine system component can be generated to identify those cooling passages having excess cooling so they can have their exit openings reduced in cross-sectional area, allowing the saved cooling potential to be used more efficiently elsewhere in the turbine or turbine system component.

FIG. 1 shows a schematic view of an illustrative industrial machine in the form of a turbomachine 100. Some of the turbine system components of turbomachine 100 may include a cooling passage according to teachings of the disclosure. In the example, turbomachine 100 is in the form of a combustion or gas turbine system. Turbomachine 100 includes a compressor 102 and a combustor 104. Combustor 104 includes a combustion region 106 and a fuel nozzle assembly 108. Turbomachine 100 also includes a turbine assembly 110 and a common compressor/turbine shaft 112 (sometimes referred to as a rotor 112). In one embodiment, turbomachine 100 may be a 7FA.04 gas turbine (GT) system, commercially available from GE Vernova. The present disclosure is not limited to any one particular GT system and may be implanted in connection with other engines including, for example, the other HA, F, B, LM, GT, TM and E-class engine models of GE Vernova, and engine models of other companies. The present disclosure is not limited to any particular turbine or turbomachine, and may be applicable to, for example, steam turbines, jet engines, compressors, turbofans, etc. Furthermore, the present disclosure is not limited to any particular component and may be applied to any form of hot component exposed to, for example, hot combustion gases in a combustor or a hot gas path of a turbine, and requiring cooling. The disclosure may also be applied to any industrial machine, other than a turbomachine, that requires cooling reduction of a hot component.

Continuing with FIG. 1, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110, which can also be called a turbine system, includes a turbine 111 that rotatably couples to and drives rotor 112. Compressor 102 also is rotatably coupled to rotor 112. In the illustrative embodiment, there is a plurality of combustors 106 and fuel nozzle assemblies 108.

Figure 2:
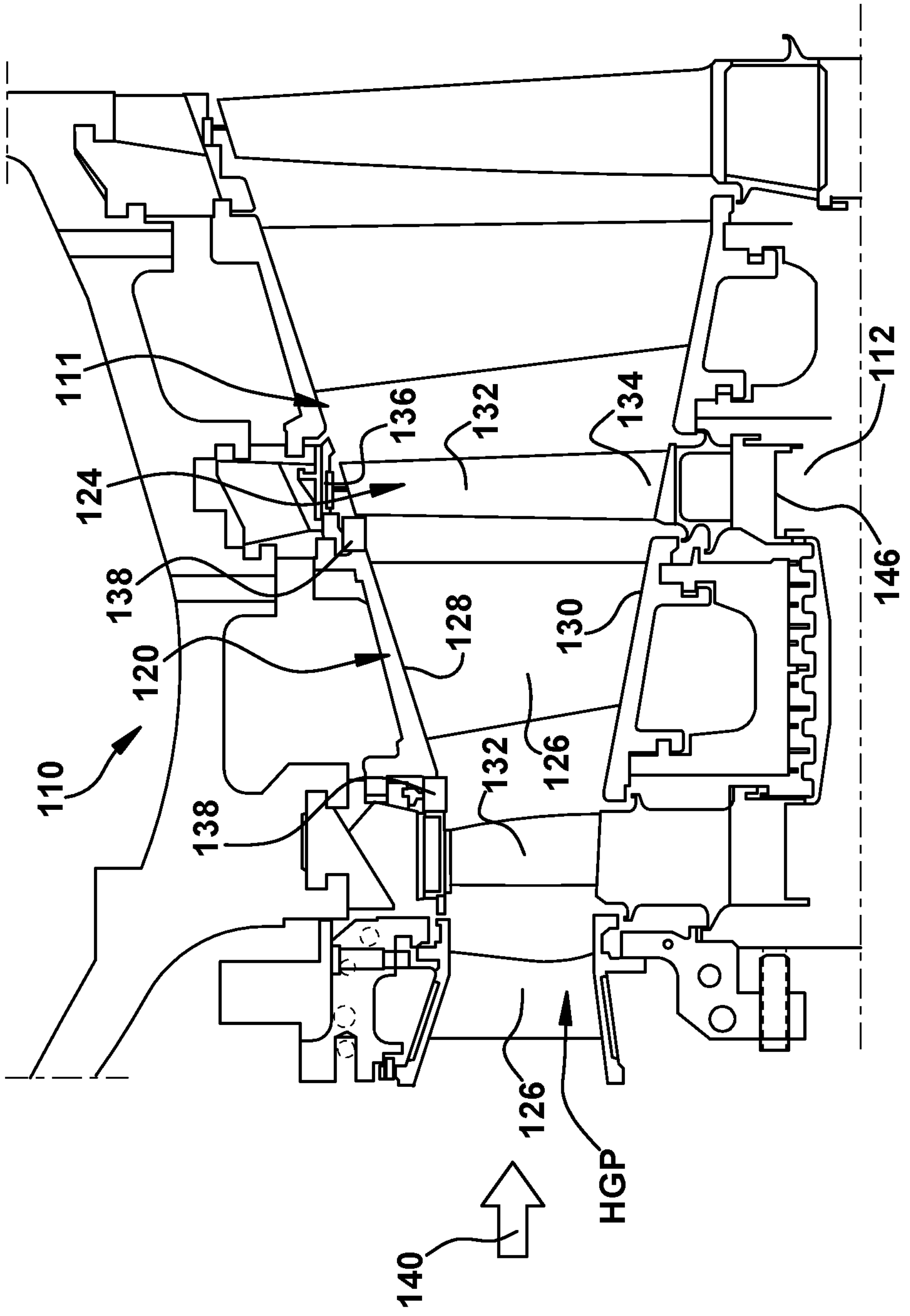
Fig. 2 (Prior Art)
FIG. 2 shows a cross-sectional view of an illustrative gas turbine assembly that may be used with the gas turbine system in FIG. 1.

FIG. 2 shows a cross-sectional view of a part of an illustrative turbine assembly 110 of turbomachine 100 (FIG. 1). Turbine 111 of turbine assembly 110 includes a row or stage of nozzles 120 coupled to a stationary casing 122 of turbomachine 100 and axially adjacent a row or stage of rotating blades 124. A stationary nozzle 126 (also known as a vane) may be held in turbine assembly 110 by a radially outer platform 128 and a radially inner platform 130. Each stage of blades 124 in turbine assembly 110 includes rotating blades 132 coupled to rotor 112 and rotating with the rotor. Rotating blades 132 may include a radially inner platform 134 (at root of blade) coupled to rotor 112 and a radially outer tip 136 (at tip of blade). Shrouds 138 may separate adjacent stages of nozzles 126 and rotating blades 132. A working fluid 140, including for example combustion gases in the example gas turbine, passes through turbine 111 along what is referred to as a hot gas path (hereafter simply "HGP"). The HGP can be any area of turbine 111 exposed to combustion gases having hot temperatures. Various components of turbine 111 are exposed directly or indirectly to the HGP in turbine 111, or hot combustion gases in combustor 104, and may comprise a hot gas turbine system component 200 (hereinafter "turbine system component"). In the example turbine 111, nozzles 126, blades 132 and shrouds 138 are all examples of turbine system components that may benefit from the teachings of the disclosure. It will be recognized that other parts of turbine 111 exposed directly or indirectly to the HGP may also be considered turbine system components capable of benefiting from the teachings of the disclosure.

Figure 3:
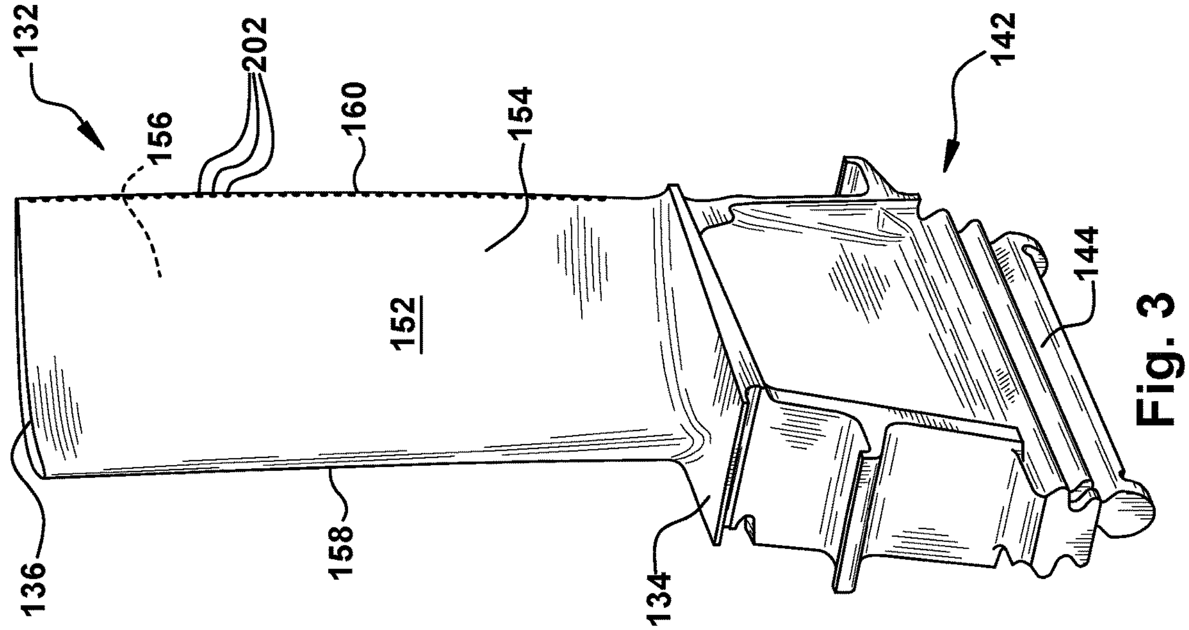
FIG. 3 shows a perspective view of a turbine system component in the form of a rotating blade, according to embodiments of the disclosure.
Figure 4:
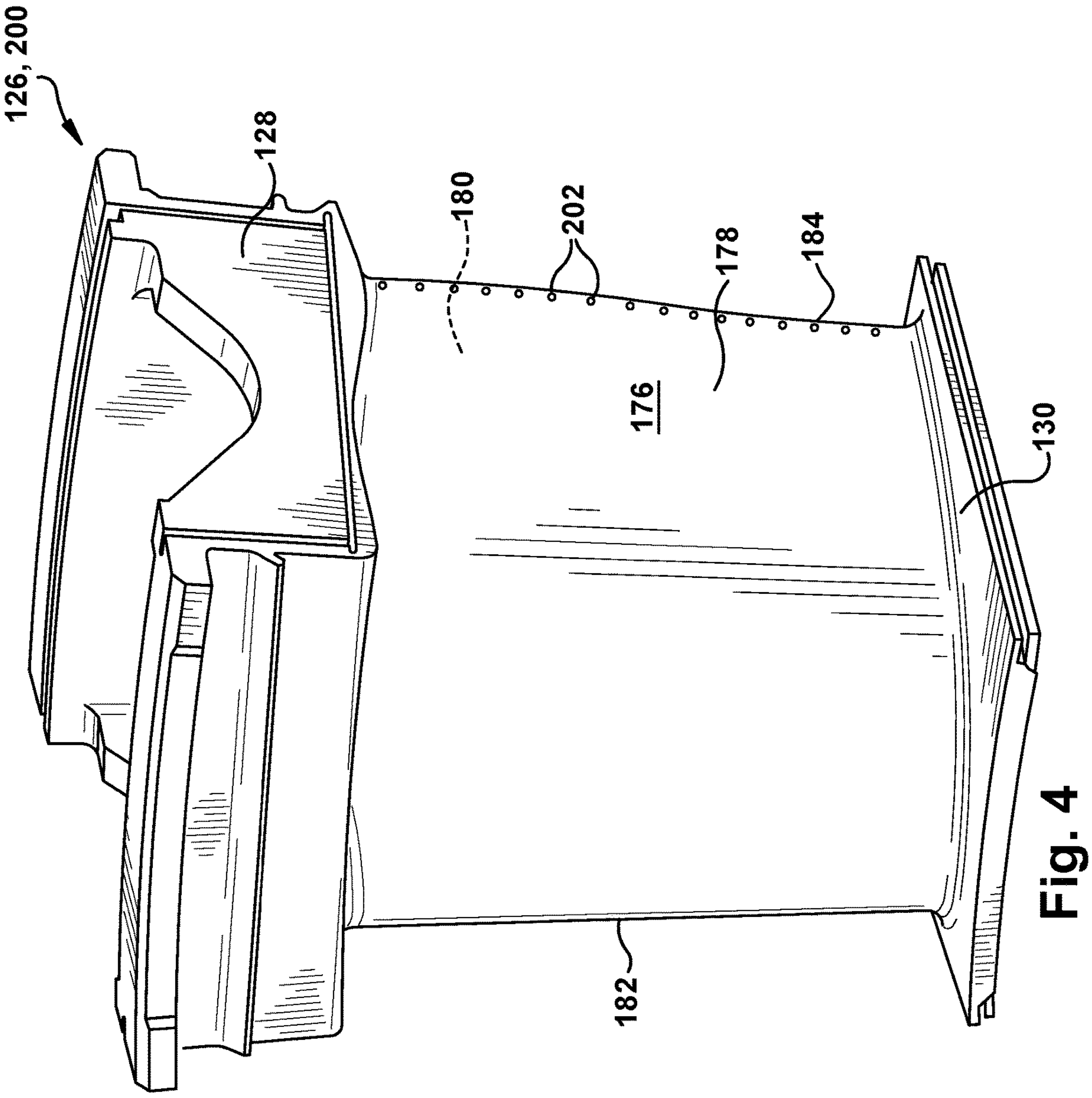
FIG. 4 shows a perspective view of a turbine system component in the form of a nozzle, according to embodiments of the disclosure.
Figure 5:
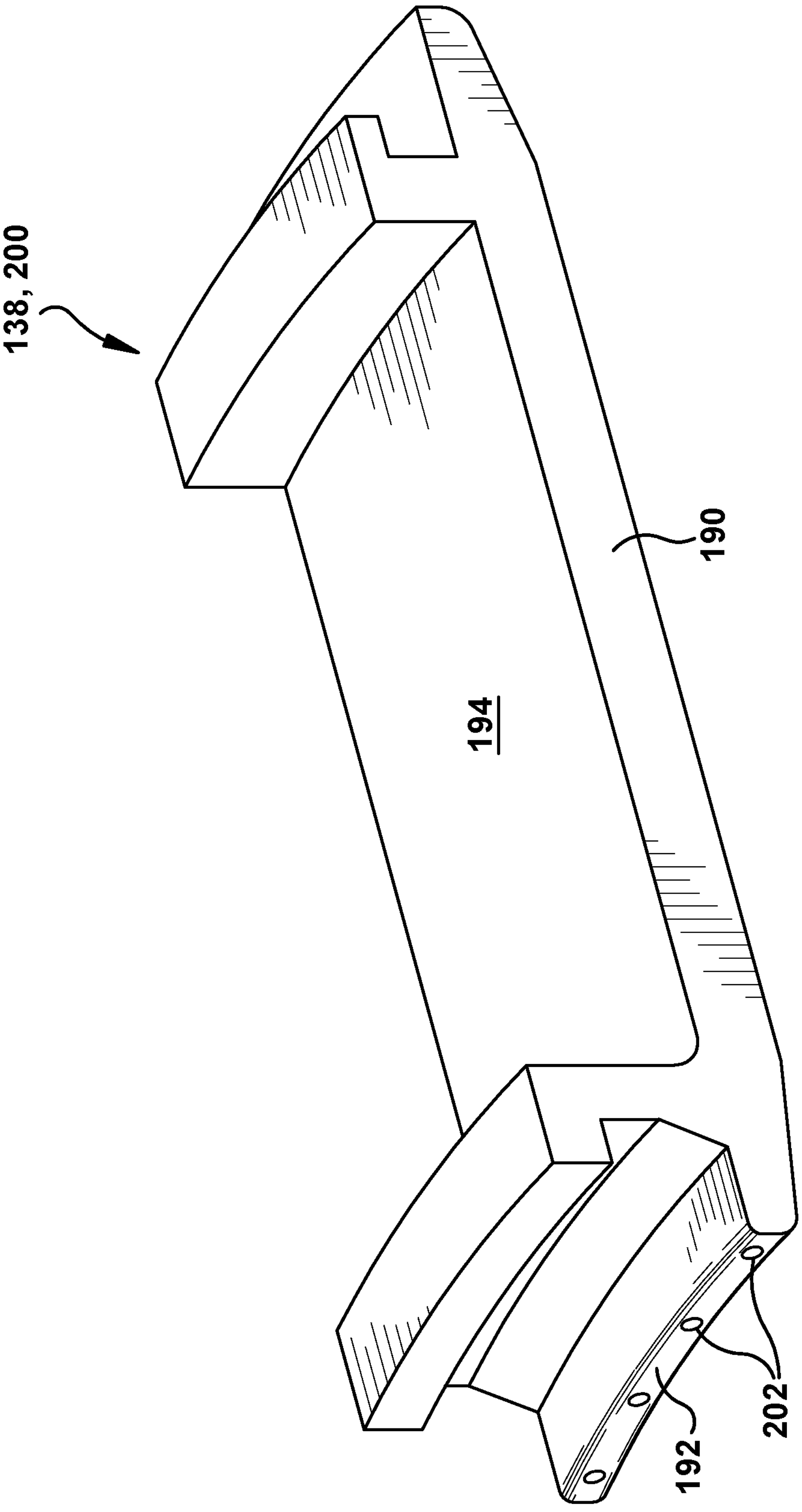
FIG. 5 shows a perspective view of a turbine system component in the form of a shroud, according to embodiments of the disclosure.

FIGS. 3-5 show perspective views of examples a turbine system component 200 in which teachings of the disclosure may be employed. FIG. 3 shows a perspective view of turbine system component 200 in the form of a rotating blade 132. Rotating blade 132 includes a root 142 by which rotating blade 132 attaches to rotor 112 (FIG. 2). Root 142 may include a dovetail 144 configured for mounting in a corresponding dovetail slot in the perimeter of a rotor wheel 146 (FIG. 2) of rotor 112 (FIG. 2). Root 142 may further include a shank 148 that extends between dovetail 142 and platform 134, which is disposed at the junction of airfoil 152 and root 142 and defines a portion of the inboard boundary of HGP through turbine assembly 110. It will be appreciated that airfoil 152 is the active component of rotating blade 132 that intercepts the flow of working fluid and induces the rotor disc to rotate. It will be seen that airfoil 152 of rotating blade 132 includes a concave pressure side (PS) outer wall 154 and a circumferentially or laterally opposite convex suction side (SS) outer wall 156 extending axially between opposite leading and trailing edges 158, 160 respectively. Sidewalls 154 and 156 also extend in the radial direction from platform 150 to radial outer tip 136. Tip 136 may include any now known or later developed tip shroud (not shown). A cooling passage 202 (FIGS. 6-16) according to embodiments of the disclosure can be used, for example, within airfoil 152, platform 134 or other parts of rotating blade 132.

FIG. 4 shows a perspective view of a turbine system component 200 in the form of a stationary nozzle 126. Nozzle 126 includes radial outer platform 128 by which nozzle 126 attaches indirectly to stationary casing 122 (FIG. 2) of the turbomachine. Outer platform 128 may include any now known or later developed mounting configuration for mounting in a corresponding mount in the casing. Nozzle 126 may further include radially inner platform 130 for positioning between adjacent turbine rotating blades 132 (FIG. 3) platforms 134 (FIG. 3). Platforms 128, 130 define respective portions of the outboard and inboard boundary of the HGP through turbine assembly 110. It will be appreciated that airfoil 176 is the active component of nozzle 126 that intercepts the flow of working fluid and directs it towards turbine rotating blades 132 (FIG. 3). It will be seen that airfoil 176 of nozzle 126 includes a concave pressure side (PS) outer wall 178 and a circumferentially or laterally opposite convex suction side (SS) outer wall 180 extending axially between opposite leading and trailing edges 182, 184, respectively. Sidewalls 178 and 180 also extend in the radial direction from platform 130 to platform 128. A cooling passage 202 (FIGS. 6-16) according to embodiments of the disclosure can be used, for example, within airfoil 176, platforms 128, 130 or other parts of nozzle 126.

FIG. 5 shows a perspective view of turbine system component 200 in the form of a shroud 138. Shroud 138 may include a platform 190 for positioning between tips 136 (FIGS. 2-3) of turbine rotating blades 132 (FIGS. 2-3) and radially outer platforms 128 (FIGS. 2 and 4) of nozzles 126 (FIGS. 2 and 4). Shroud 138 may fasten to casing 122 (FIG. 2) in any fashion. A cooling passage 202 (FIGS. 6-16) according to embodiments of the disclosure can be used, for example, within face 192 or an inner surface 194 or other parts of shroud 138.

Referring collectively to FIGS. 3-5, as noted, embodiments of the disclosure described herein may be applied to any turbine system component 200 of turbine 111 (FIG. 2), such as but not limited to turbine rotating blades 132 (FIG. 3), nozzles 126 (FIG. 4) and/or shrouds 138 (FIG. 5). It is emphasized however that teachings of the disclosure are also applicable to combustor 104 components such as fuel nozzles, liners, flow channels, head end components, among others. It will be recognized that the turbine system components 200 oftentimes include one or more cooling circuits therein that include one or more cooling passages 202 to deliver a coolant, typically a gas such as air, to parts thereof exposed to hot combustion gases of combustor 104 or the HGP of turbine 111, to cool those parts. Referring to FIGS. 6-16, for purposes of description, cooling passage 202 according to embodiments of the disclosure will be illustrated and described relative to a schematic body 210, which could include any part of turbine system component 200 such as but not limited to trailing edge 160, 184 of airfoil 152, 176 for rotating blade 132 or nozzle 126, respectively. It is emphasized that the teachings of the disclosure may be applied to any cooling passage 202 exiting an exterior surface 212 of a body 200 in any turbine system component 200.

Figure 6:
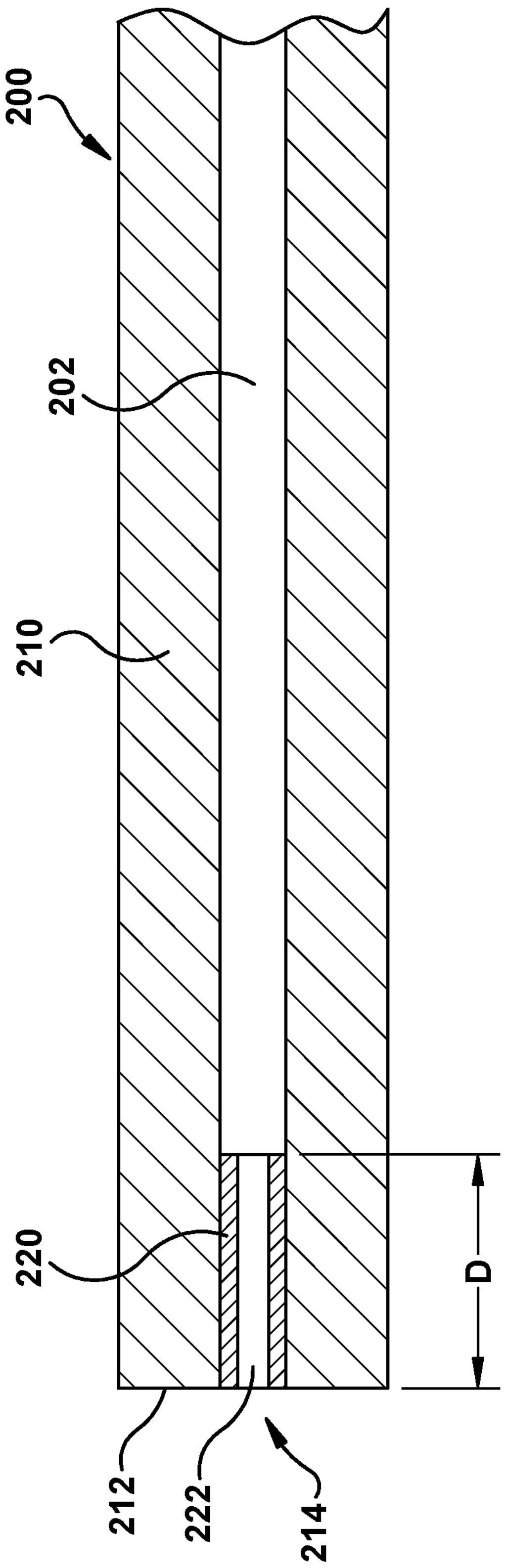
FIG. 6 shows a schematic length-wise, cross-sectional view of a cooling passage in an illustrative turbine system component, according to embodiments of the disclosure.
Figure 7:
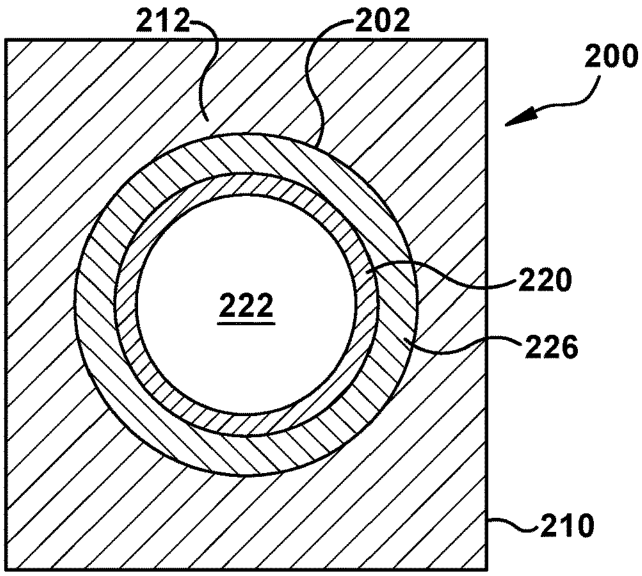
FIG. 7 shows a schematic width-wise, cross-sectional view of a cooling passage in an illustrative turbine system component, according to embodiments of the disclosure.

FIG. 6 shows a schematic length-wise, cross-sectional view of a cooling passage 202 in an illustrative turbine system component 200, and FIG. 7 shows a schematic width-wise, cross-sectional view of a cooling passage 202 of an illustrative turbine system component 200, according to embodiments of the disclosure. Turbine system component 200 includes body 210 having exterior surface 212. As noted, body 210 may be part of a hot gas path component of turbine 111 (FIG. 2). Turbine system component 200 also includes cooling passage 202 defined in body 210. Cooling passage 202 may be fluidly coupled to any cooling circuit(s) within body 210. Body 210 can be any structure capable of having cooling passage 202 therein such that it extends to an (original) exit opening 214 in exterior surface 212 thereof. Body 210 can include any now known or later developed material for a hot component. In the setting of turbine 111, body 210 may include a nickel or cobalt-based superalloy. More particularly, it may include a superalloy appropriate for turbine system components such as but not limited to:

nickel-based superalloys such as R108, MarM 247/CM-247, GTD-222/241/262/111/141/444, Rene N5/N4/N400/N500, Inco 738; or similarly structured cobalt superalloys.

Cooling passage 202 has a cross-sectional area in body 210, referred to herein as a "passage cross-sectional area." The cross-sectional area of cooling passage 202 may vary along its length. The passage cross-sectional area can be calculated as an average cross-sectional area over a length of cooling passage 202, excluding where a hollow member 220 as described herein is used. In FIG. 7, cooling passage 202 has a generally circular width-wise cross-section, such that the passage cross-sectional area is circular. However, cooling passage 202 may have a variety of non-circular cross-sectional shapes. Cooling passage 202 has a generally linear or straight layout, but may have some curvature. A cooling passage 202 length may be that part of it that is generally linear and fluidly communicates with exterior surface 212 of body 210.

FIGS. 6 and 7 also show turbine system component 200 including a hollow member 220 coupled in cooling passage 202 and defining a (new) exit opening 222 at exterior surface 212 of body 210. Hollow member 220, at exit opening 222, has a cross-sectional area that is less than the passage cross-sectional area. For reference purposes, the cross-sectional area of hollow member 220 is referred to herein as the "member cross-sectional area." In this manner, hollow member 220 reduces the amount of coolant passing through cooling passage 202 and out of exit opening 222 compared to original exit opening 214, reducing the cooling capabilities of cooling passage 202. The reduction in cross-sectional area of exit opening 222 can be user defined. In one example, member cross-sectional area is about 30% to 50% of the passage cross sectional area. Alternatively, the passage cross-sectional area is about 2 to 3 times larger than the member cross-sectional area. It will be recognized that the cross-sectional areas may vary depending on a number of factors such as but not limited to, turbine system component 200 size, location of turbine system component to be cooled, amount of cooling desired, and/or the particular cooling passage. Hollow member 220 has an exterior cross-section shaped to allow coupling to an interior cross-section of cooling passage 202.

Hollow member 220 may be coupled in cooling passage 202 in body 210 by any number of joining techniques including brazing, soldering, resistance welding, among other techniques. In one embodiment, shown in FIG. 7, hollow member 220 may be coupled in cooling passage 202 in body 210 by a braze material 226. In another embodiment, braze material 26 may have a maximum thickness of 300 μm. Braze material 226 may include any appropriate material for brazing the materials of body 210 and hollow member 220, such as but not limited to nickel-based, low-melt temperature braze materials such as AMS4782, 103, D15, DF4B or B1P braze materials. Hollow member 220 is made of a material having a melt temperature higher than an operating temperature of the turbine system. Accordingly, operation of the turbine system does not impact hollow member 220, e.g., its internal cross-sectional area does not change. Hollow member 220 may include, for example, a nickel-chromium-based superalloy, a cobalt-based superalloy, or a stainless steel, such as but not limited to: Inconel® 625 (available from Special Metals Corporation), or 300 series stainless steels. In one embodiment, hollow member 220 may extend inwardly of exterior surface 212 at exit opening 222 no less than a hydraulic diameter of cooling passage 202. In certain embodiments, hollow member 220 may extend inwardly (see distance D) of exterior surface

212 at exit opening 222 from a portion of the length of the cooling passage up to a maximum of an entire length of cooling passage 202.

Figure 8:
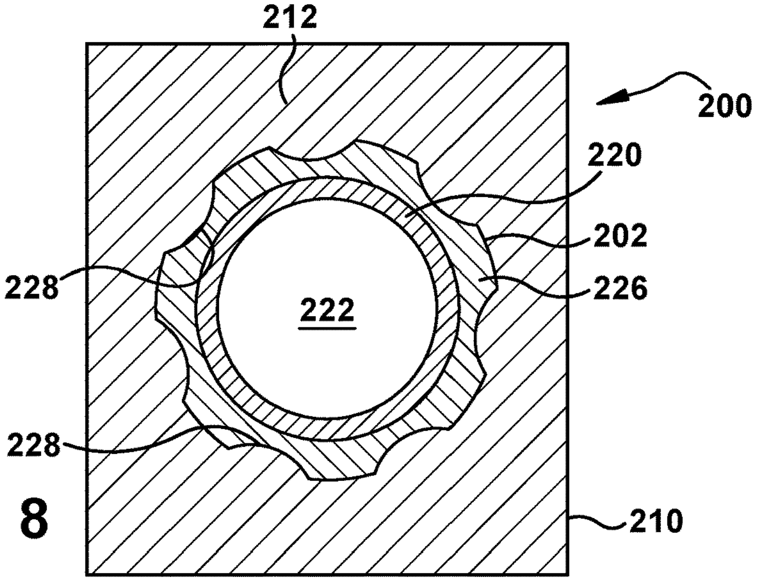
FIG. 8 shows a schematic width-wise, cross-sectional view of cooling passage, according to another embodiment of the disclosure.

Hollow member 220 may have a variety of shapes. In FIG. 7, cooling passage 202 is shown with a generally circular cross-section. Here, hollow member 220 has an external cross-section having a shape matching the shape of internal cross-section of at least a portion of cooling passage 202. In this example, hollow member 220 may be tubular. Hollow member 220 may have a minimum wall thickness in a range of, for example, 0.1 to 0.3 millimeters, and the wall thickness is generally consistent along is length. An interior cross-section of cooling passage 202 may have a number of different shapes that hollow member 220 can be formed to accommodate. FIG. 8 shows a schematic width-wise, cross-sectional view of cooling passage 202, according to another embodiment of the disclosure. Cooling passage 202 in FIG. 8 has a generally circular cross-section but includes a plurality of turbulators 228, e.g., protrusions or dimples, on an interior surface thereof. Turbulator 228 may be provided to, for example, improve cooling capabilities of a coolant flow therethrough. Cross-sectional shapes other than circular are also possible, e.g., oval or otherwise oblong, polygonal, etc. Hollow member 220 may have an accommodating external cross-section to allow insertion into original exit opening 214 of, and/or coupling in, cooling passage 202 at exterior surface 212 in body 210. For example, hollow member 220 may have a circular cross-section smaller than in a smallest diameter between turbulators 228, or it may include seats to capture turbulator 228, etc.

Figure 9:
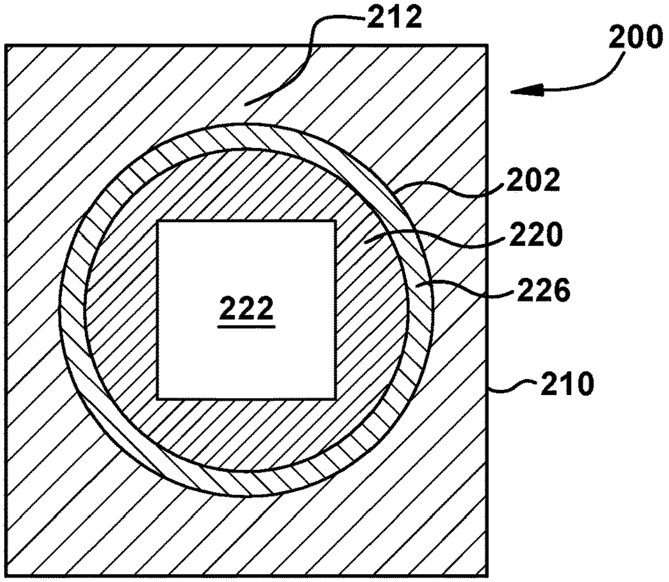
FIG. 9 shows a schematic width-wise, cross-sectional view of a hollow member and cooling passage according to yet another embodiment of the disclosure.

FIG. 9 shows a schematic width-wise, cross-sectional view of hollow member 220 and cooling passage 202, according to yet another embodiment of the disclosure. In certain embodiments, hollow member 220 need not be tubular, e.g., with inner and outer cross-sectional shapes that are circular along its length. That is, the external cross-section of hollow member 220 may be different than an internal cross-section of hollow member 220. Hollow member 220 may have an external cross-section having a shape matching a shape of an internal cross-section of at least a portion of cooling passage 202. In FIG. 9, for example, an external cross-section of hollow member 202 is generally circular to match an internal cross-section of at least a portion of cooling passage 202, and the internal cross-section of hollow member 220 (e.g., polygonal such as square) may be different than the external cross-section of hollow member 220 (e.g., circular). Other shapes are also possible for both the external and internal cross-sections of hollow member 220.

Figure 10:
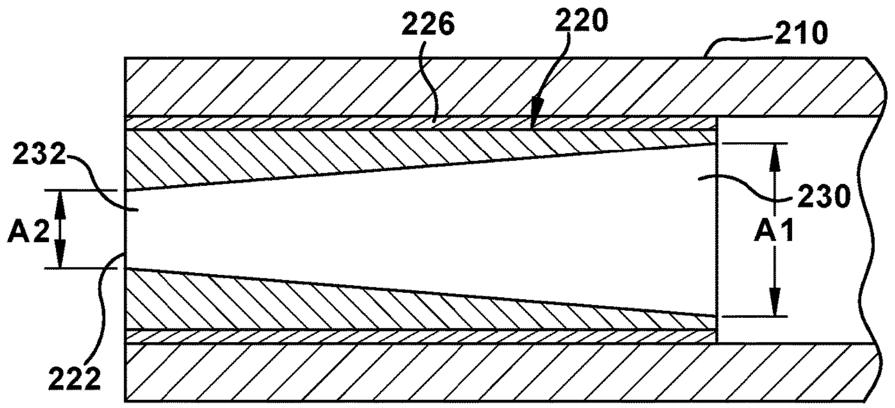
FIG. 10 shows a schematic length-wise, cross-sectional view of a hollow member and cooling passage, according to another embodiment of the disclosure.

FIG. 10 shows a schematic length-wise, cross-sectional view of hollow member 220 and cooling passage 202, according to another embodiment of the disclosure. In previous embodiments, hollow member 220 may have the same internal and external shapes along its length having the same dimensions. That is, at any length-wise cross-section, a wall thickness on both sides of hollow member 220 would have a uniform length-wise thickness. In alternative embodiments, shown in FIG. 10, hollow member 220 may have a cross-sectional area at an inner end 230 thereof internal to body 210 that is different than member cross-sectional area at exit opening 222. In this case, hollow member 220 has a larger cross-sectional area where it fluidly meets the passage cross-sectional area of cooling passage 202 within body 210 than member cross-sectional area at exit opening 222. That is, its wall thickness increases and its cross-sectional area decreases as coolant flow progresses from cooling passage 202 towards exit opening 222. Hence, hollow member 220 becomes narrower as flow progresses from cooling passage 202 to exit opening 222. Hollow member 220 can include a variety of other features including but not limited to: flared ends, inner turbulators, etc.

Figure 11:
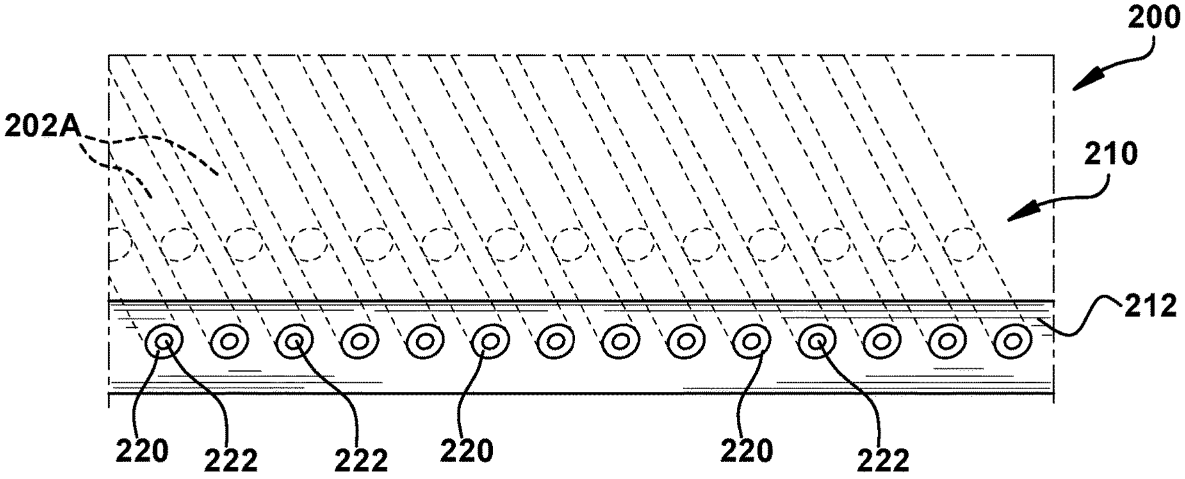
FIG. 11 shows an end view of an exterior surface of a body of a turbine system component with all of a plurality of cooling passages having a hollow member therein, according to embodiments of the disclosure.
Figure 12:
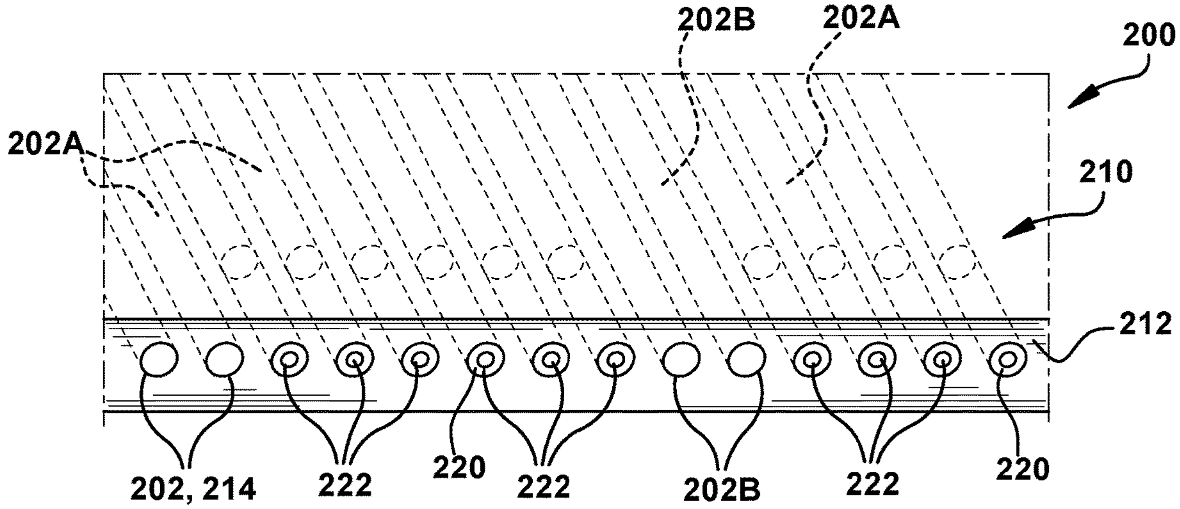
FIG. 12 shows an end view of an exterior surface of a body of a turbine system component including a plurality of cooling passages some of which include a hollow member therein, according to embodiments of the disclosure.
Figure 13:
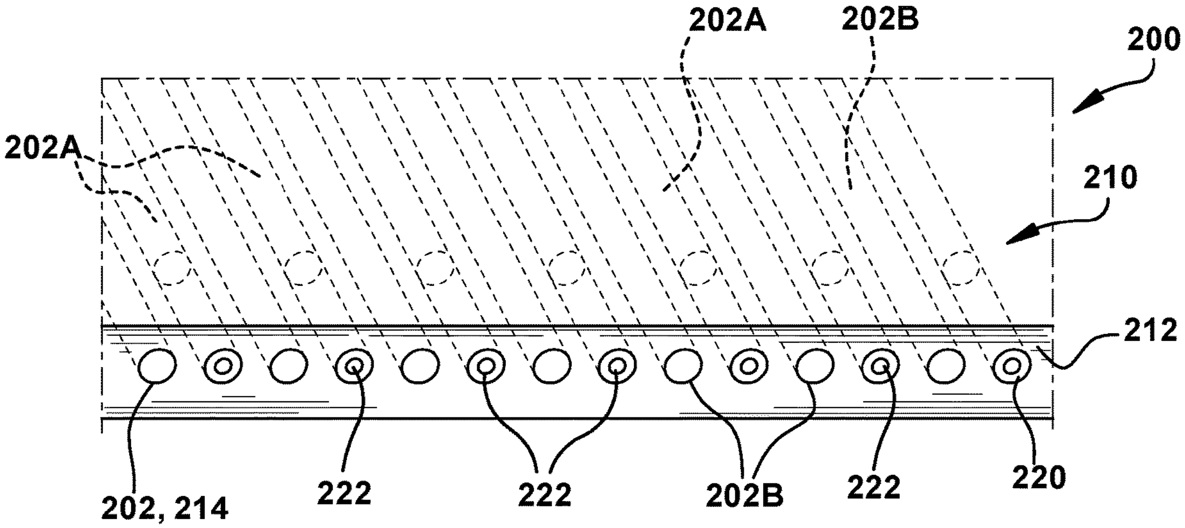
FIG. 13 shows an end view of an exterior surface of a body of a turbine system component including a plurality of cooling passages some of which include a hollow member therein, according to embodiments of the disclosure.

Turbine system components 200 oftentimes include a plurality of cooling passages 202, each of which may exit body 210 at exterior surface 212. FIG. 11 shows an end view of exterior surface 212 of body 210 of a turbine system component 200 including a plurality of cooling passages 202 (inside body 210). In this example, all cooling passages 202 (inside body 210) include hollow member 220 therein. Hence, all cooling passages 202 have the smaller, member cross-sectional area in body 210. In this manner, the cooling capability of all of cooling passages 202 have been reduced. In an alternative embodiment, only some of cooling passages 202 may include hollow members 220 therein. FIG. 12 shows an end view of exterior surface 212 of body 210 of a turbine system component 200 including a plurality of cooling passages 202A, 202B (inside body 210), some of which include hollow members 220 and some of which do not. In this case, hollow member 220 may be used in only select cooling passages 202A of a plurality of cooling passages defined in body 210. In FIG. 12, hollow member 220 defines exit opening 222 at exterior surface 212 of body 210 having the member cross-sectional area for each of the selected cooling passages 202A of the plurality of cooling passages 202A, 202B. Thus, each of the selected cooling passages 202A of the plurality of cooling passages have the smaller member cross-sectional area in body 210 at exit opening 222 thereof in exterior surface 212 of body 210. The other cooling passages 202B that do not include hollow member 220 remain having the larger passage cross-sectional area at original exit opening 214. That is, a plurality of other cooling passage(s) 202B may be defined in body 210, with each of cooling passages 202B in body 210 exiting exterior surface 212 of body 210 at exit opening 214 defined in body 210 having the larger passage cross-sectional area. Cooling passages 202B also have the original, larger cooling capability. In a given turbine system component 200, any number of cooling passages 202 or different sets of cooling passages 202 can be resized with the same sized hollow member 220 or different sized hollow members 220.

Cooling passage(s) 202A and cooling passage(s) 202B having exit openings 222, 214, respectively, that have different cross-sectional areas may be arranged in any desired manner. In FIG. 12, for example, two cooling passages 202B are separated by six cooling passages 202A in a pattern that may or may not repeat. In another embodiment, shown in FIG. 13, the different cooling passages 202A, 202B may alternate along exterior surface 212 of body 210. Any pattern may be employed to obtain the desired cooling characteristics.

Figure 14:
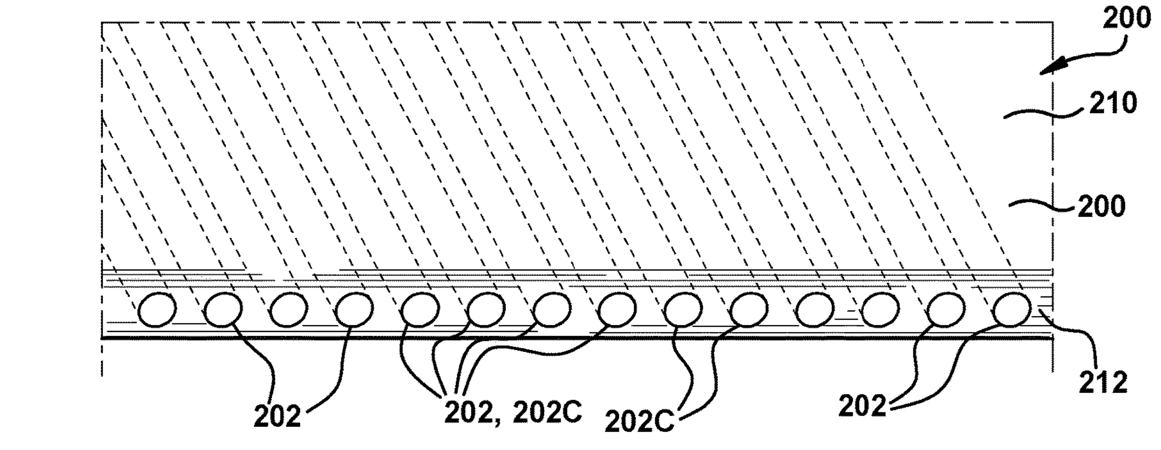
FIG. 14 shows an end view of an exterior surface of a body of a turbine system component including a plurality of cooling passages, according to embodiments of the disclosure.
Figure 15:
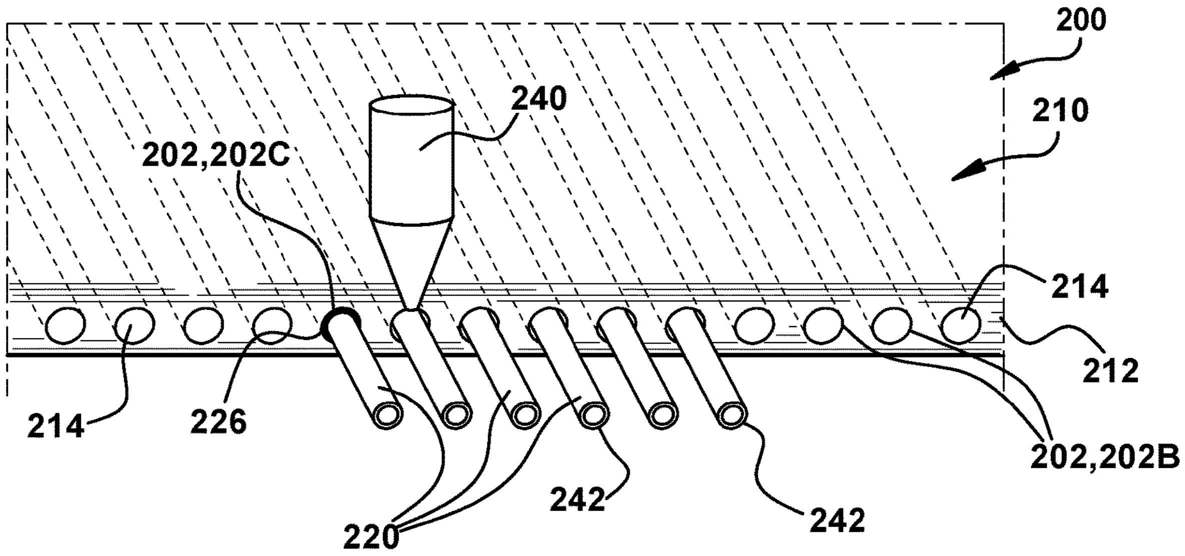
FIG. 15 shows an end view of an exterior surface of a body of a turbine system component including coupling a hollow member into selected cooling passages, according to embodiments of the disclosure.
Figure 16:
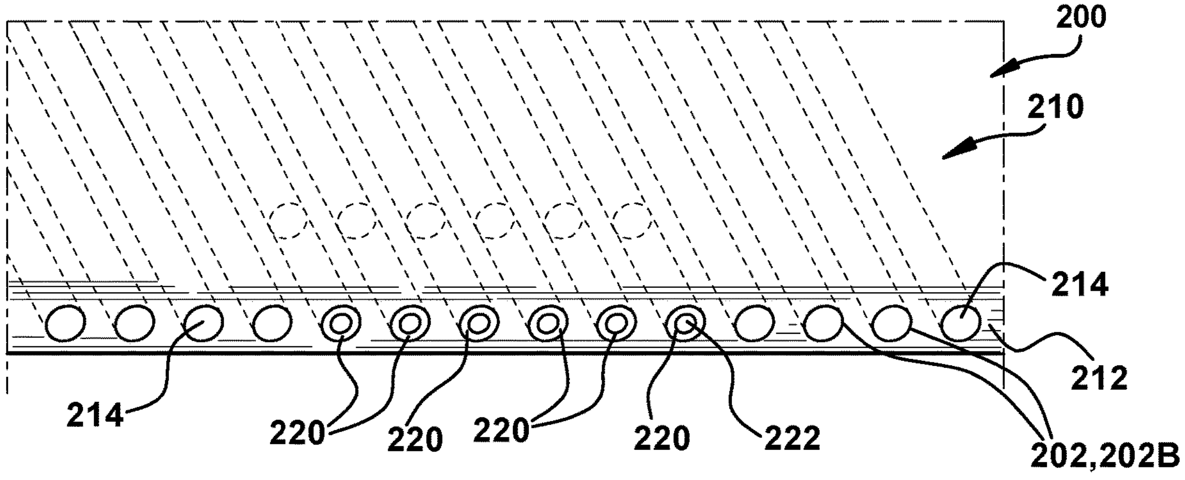
FIG. 16 shows an end view of an exterior surface of a body of a turbine system component including removing a portion of hollow members extending beyond the exterior surface of the body, according to embodiments of the disclosure.

Referring to FIGS. 14-16, methods according to various embodiments of the disclosure will be described. Cooling passages 202 in which a hollow member 220 is employed can be selected in a number of ways. As noted, in one example, all cooling passages 202 can receive a respective hollow member 220 (FIG. 11). In another example, cooling passages 202 to receive a respective hollow member 220 can be randomly selected. In another example, cooling passages 202 to receive a respective hollow member 220 can be selected to form a certain pattern. For example, among many other arrangements, cooling passages 202A, 202B can be arranged with: alternating cooling passages; one or more cooling passages with hollow members adjacent one or more cooling passage without; repeating patterns; a percentage of cooling passages; and/or on certain locations on turbine system component 200. In any event, at least one cooling passage 202 from the plurality of cooling passages to receive a hollow member 220 can be identified based on a cooling profile of turbine system component 200 indicating any cooling passage(s) 202 having excess cooling capacity. A cooling profile can be ascertained using any now known or later developed software system employing empirical data, measured data, and/or thermal modeling. In terms of empirical data, in one non-limiting example, a flow of air may be measured on turbine system components using a flow bench that pressurizes the component and measures the flow of air out of the cooling passages. The cooling profile can be generated based on the cooling attributes, measured flow characteristics, and/or other flow characteristics, and the cooling passage(s) 202C can be identified as part of the method described herein. That is, the method may include identifying cooling passage(s) 202C from the plurality of cooling passages defined in body 210 of turbine system component 200 based on the cooling profile of the turbine system component. Alternatively, the cooling profile and/or identification can be otherwise obtained, e.g., created by a third party and provided for use with the method described herein.

In any event, the cooling profile identifies cooling passages 202 that have excess cooling capacity. "Excess cooling capacity" can be identified, for example, by an excess air flow volume or flow rate compared to a required or desired airflow threshold, or it can be identified by cooling beyond a predetermined cooling threshold, e.g., a desired temperature, collective temperature amongst a number of cooling passages, among other options. The threshold of the desired parameter that indicates excess cooling capacity may be adjusted for any performance reason. It may be advantageous to reduce cooling passage 202 cross-sectional area of the identified cooling passages to reduce their cooling capability. The saved cooling capability can be used in another location or for a different purpose, increasing the overall efficiency of, for example, turbine system component 200 and/or turbomachine 100 (FIG. 1). The cooling capabilities of a particular cooling passage 202 can be based a wide variety of factors such as but not limited to: exit opening cross-sectional area; passage cross-sectional area; passage and exit opening physical condition (e.g., physically closed); clogging; oxidation or other wear to exterior surface 212; conditions of upstream cooling passages or circuits; number of cooling passages 202; inner and outer diameter of hollow member 220 therein; and/or coolant temperature, pressure, flow rate. Hollow member 220 can be selected to obtain the desired cooling capabilities.

FIG. 14 shows an end view of exterior surface 212 of body 210 of a turbine system component 200 including a plurality of cooling passages 202 (inside body 210). Certain cooling passages 202C have been identified as locations having excess cooling capability, and thus targeted to receive hollow members 220. FIG. 15 shows coupling a hollow member 220 into cooling passage(s) 202C (six shown) in exterior surface 212 of body 212 of turbine system component 200. As noted, cooling passage(s) 202C defined in body 210 have passage cross-sectional area. A cleaning of cooling passage(s) 202C, e.g., an interior surface thereof, may be optionally performed prior to inserting hollow member(s) 210 into cooling passage(s) 202C. The cleaning may include but is not limited to, a chemical or abrasive/mechanical cleaning capable of ensuring proper coupling of hollow members 220 with whatever joining technique is employed.

As shown in FIG. 15, the coupling may include inserting a hollow member 220 into selected cooling passage(s) 202C. Hollow members 220 may extend inwardly of exterior surface 212 at exit opening 222 no less than a hydraulic diameter of cooling passage 202. The extent to which hollow member 220 extends into cooling passage 202C can be set, for example, by the length of cooling passage, or the extent to which hollow members 220 are positioned in cooling passages 202C. FIG. 15 also shows physically coupling hollow member(s) 220 in respective cooling passage(s) 202C, i.e., so they cannot be removed. The physical coupling may include performing a joining process such as a brazing process to hollow member(s) 220. The brazing process may include forming braze material 226 between at least a portion of hollow member(s) 220 and respective cooling passage(s) 202C in body 210. For example, braze material may be applied as: liquid braze material at the exit of cooling passage 202 that is wicked up between turbine system component 200 and hollow member 220, braze foil between hollow member 220 and turbine system component 200, a dry braze powder or a braze paste/slurry positioned between turbine system component 200 and hollow member 220, among other techniques. The brazing process may also include performing a heat treatment process. The brazing process can be customized for the particular brazing material used and/or the materials of body 210 and hollow member 220. The coupling can be carried out using any appropriate joining equipment 240. As shown in FIG. 15, a portion 242 of hollow member(s) 220 extends outwardly beyond exterior surface 212 of body 210.

FIG. 16 shows an end view of turbine system component 200 and removing portion 242 (FIG. 15) of hollow member(s) 220 extending beyond exterior surface 212 of body 210, e.g., by cutting or grinding them off. After the removal, hollow member(s) 220 define exit opening 222 in fluid communication with cooling passage(s) 202C at exterior surface 212 of body 210, as described herein. Hollow member(s) 220 at exit opening 222 have the member cross-sectional area that is less than the passage cross-sectional area, reducing the coolant flow through cooling passages 202C. Body 210 may also include cooling passage(s) 202B having the larger, original exit opening 214 in exterior surface 212 of body 210 of turbine system component 200. That is, cooling passage(s) 202B are defined in body 210 and have the larger, passage cross-sectional area in body 210 at original exit opening 214 in exterior surface 212 of body 210. In one example, passage cross-sectional area may be in a range of 1.31 to 1.70 square millimeters ($mm^2$), and member cross-sectional area may be in a range of 0.58 to 0.62 $mm^2$. A noted, other cross-sectional areas are also possible.

Embodiments of the disclosure provide a turbine system component and method to allow reduction in the cross-sectional area of the exit opening of cooling passage(s), and selectively reduce the cooling capabilities of the cooling passage(s). The cooling profile of the turbine system component can be used to identify those cooling passages having excess cooling so they can have their exit openings reduced in cross-sectional area, allowing the saved cooling potential to be used more efficiently elsewhere in the turbine or turbine system component.

Figure 17:
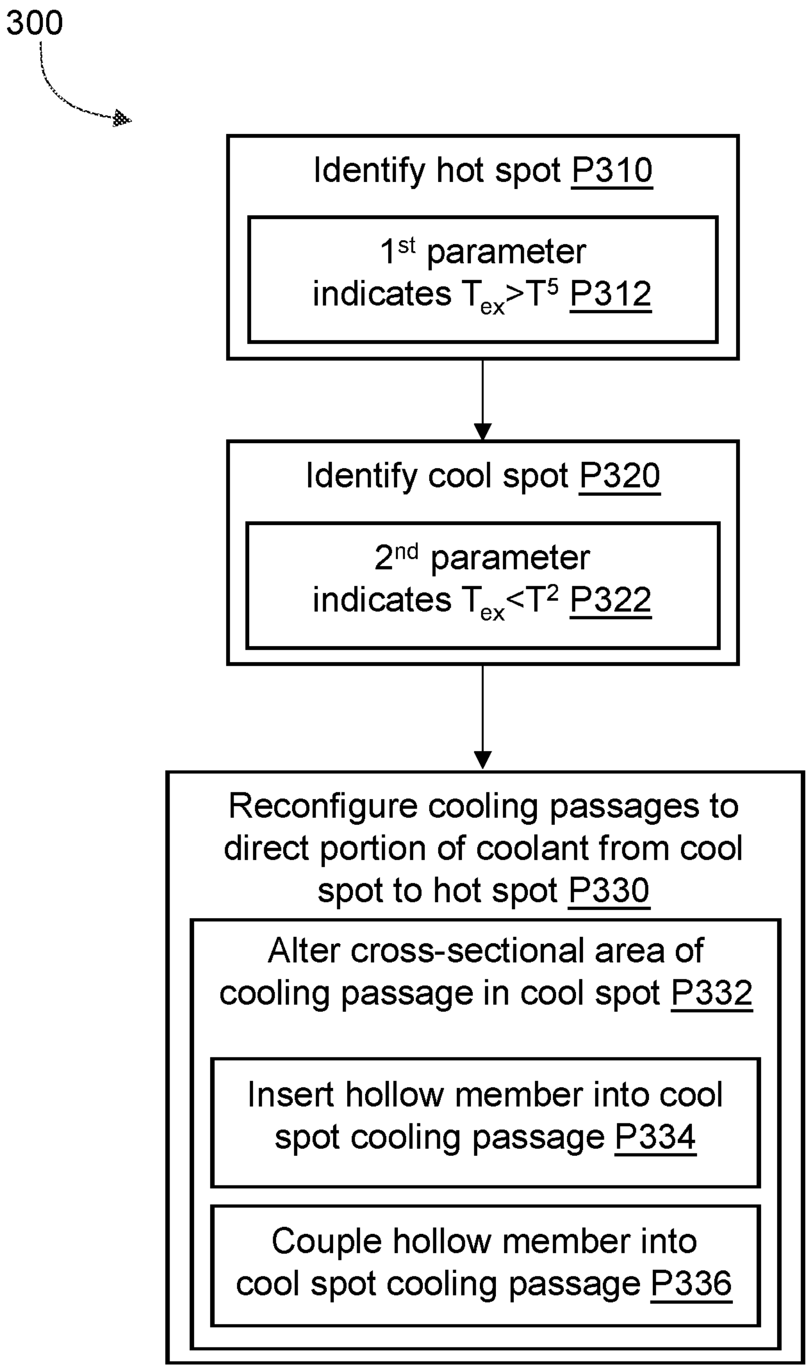
FIG. 17 shows a schematic diagram illustrating an example of a coolant redirection method in a turbine system component, according to embodiments of the disclosure.

In embodiments, with additional reference to FIG. 17, a method 300 can be used to redirect coolant flow. Broadly, method 300 can include identifying a hot spot P310 on exterior surface 212 of body 210 of component 200 of a turbine system 110, identifying a cool spot P320 on exterior surface 212, and reconfiguring a plurality of cooling passages 220 to direct a portion of a coolant from the cool spot to the hot spot P330. In identifying the hot spot P310, a first parameter of component 200 can indicate that a temperature $T_{ex}$ of exterior surface 212 in the hot spot exceeds a first threshold value $T^5$ P312, and the first parameter of the component can be measured after operation of turbine system 110. In identifying the cool spot P320, a second parameter of component 200 can indicate that the temperature $T_{ex}$ of exterior surface 212 in the cool spot is below a second threshold value $T^2$ P322, and a cooling profile of component 200 can be used. Such a cooling profile can be based at least in part on flow of coolant through the plurality of cooling passages 220 as described above. Identifying the cool spot can include identifying a cool spot cooling passage that has excess cooling capacity, such as by using a cooling profile of component 200.

The threshold value(s) may be a range of temperatures, for example, temperature range $T^1$-$T^2$ may indicate a region of the component that has excess cooling capacity. Temperature range $T^3$-$T^4$ may indicate a region having adequate or satisfactory cooling capacity, and temperature range $T^5$ or greater may indicate a region of the component with insufficient cooling capacity. The superscript numerals n (e.g., $T^n$) indicate a relative temperature, for example $T^1$ is less than $T^2$, $T^2$ is less than $T^3$, and so on. In this example, areas of the component in the $T^3$-$T^4$ range have adequate cooling and are preferably not modified. However, areas of the component in the temperature range $T^1$-$T^2$ operate cooler than required so some coolant flow from these areas can be redirected to areas of the component in the $T^5$ or greater range. In this manner, hot areas of the component can receive increased cooling flow so that these areas can be brought down to the temperature range $T^3$-$T^4$. Three threshold temperature ranges were described, but it is to be understood that 1, 2 or 3 or more threshold value or temperature ranges may be employed with the method described herein.

As described above, exterior surface 212 can include the plurality of cooling passages 202 extending thereto, and each cooling passage 202 can have a first cross-sectional area and a first exit opening 214 in exterior surface 212. Redirecting coolant P330 can include altering a cross-sectional area of a cool spot cooling passage in the cool spot P332 to have a second cross-sectional area that is smaller than the first cross-sectional area. Altering the cross-sectional area of the cool spot cooling passage P332 can include inserting a hollow member 220 into the cool spot cooling passage P334, and coupling hollow member 220 into the cool spot cooling passage P336. Hollow member 220 can have the second cross-sectional area and can define a second exit opening 222 in exterior surface 212 that has the second cross-sectional area. In embodiments, the cool spot cooling passage can include a first group of the plurality of cooling passages 202, and altering the cross-sectional area of the cool spot cooling passage P332 can include altering the cross-sectional area of each cool spot cooling passage of the first group according to a pattern as described above.

Figure 18:
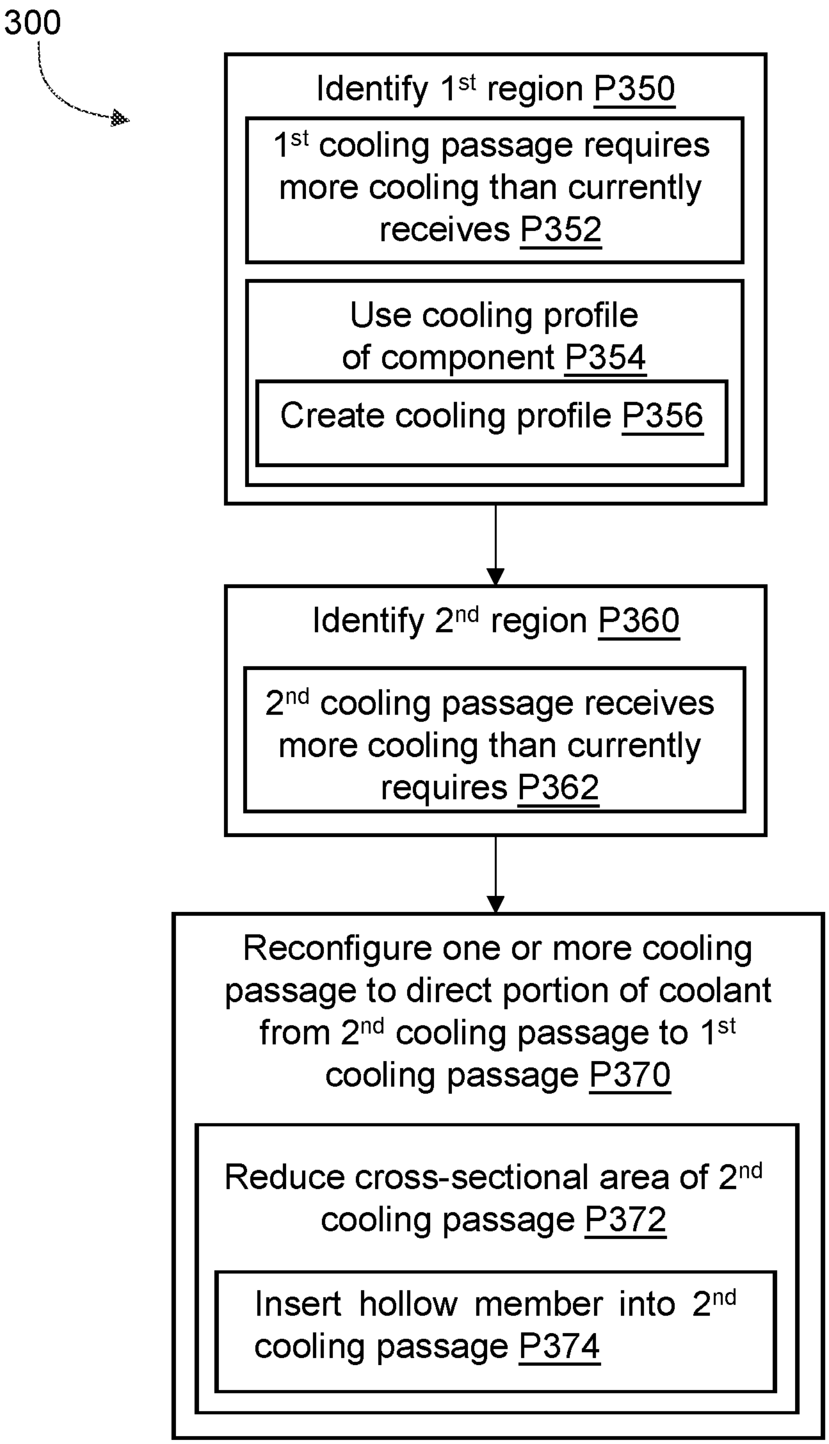
FIG. 18 shows a schematic diagram illustrating another example of a coolant redirection method in a turbine system component, according to embodiments of the disclosure.

In other words, with further reference to FIG. 18, method 300 can include identifying a first region P350 of exterior surface 212 of body 210 of component 200 of turbine system 110, wherein the first region requires more cooling than the first region currently receives P352. The first region can include a first cooling passage of a plurality of cooling passages 202 defined in body 210 of component 200 and extending to exterior surface 212 thereof. Each cooling passage 202 of the plurality of cooling passages can have a first cross-sectional area and a first exit opening 214. The first cooling passage requires more cooling than the first cooling passage currently receives. Method 300 can also include identifying a second region P360 of exterior surface 212 can include a second cooling passage of the plurality of cooling passages 202 that receives more cooling than the second cooling passage currently requires P362. Further, method 300 can include reconfiguring one or more of the cooling passage to direct a portion of a coolant from the second cooling passage to the first cooling passage P370, which can include reducing a cross-sectional area of the second cooling passage P372.

Identifying the first region P350 can include using a cooling profile of component 200 P354, which can include creating a cooling profile of component 200 P356. Such a cooling profile can be based on a parameter of exterior surface 212 after use of component 200 in turbine system 110. The parameter can include, for example, oxidation, creep, cracking, voiding, dimensional distortions, discoloration, coating spallation, or another suitable parameter as may now be known to be suitable or so known in the future. In addition, such a parameter in embodiments can be measured, while in other embodiments such a parameter can be predicted using a digital model of component 200. As described above, a cooling profile can also be based on flow of a coolant through the plurality of cooling passages 202.

In embodiments, reducing a cross-sectional area of the cool cooling passage can include inserting a hollow member 220 into the cool cooling passage P374, as described above. The hollow member can extend to exterior surface 212 of body 210 and can define a second exit opening 222 therein, the second exit opening 222 in hollow member 220 having a second cross-sectional area that is less than the first cross-sectional area, as also described above.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A method, comprising:

identifying a hot spot on an exterior surface of a body of a component of a turbine system, wherein a first parameter of the component indicates that a temperature of the exterior surface in the hot spot exceeds a first threshold value;

identifying a cool spot on the exterior surface, wherein a second parameter of the component indicates that the temperature of the exterior surface in the cool spot is below a second threshold value; and reconfiguring a plurality of cooling passages to direct a portion of a coolant from the cool spot to the hot spot, wherein the exterior surface includes the plurality of cooling passages extending thereto, each cooling passage having a first cross-sectional area and a first exit opening in the exterior surface, and wherein the redirecting coolant includes altering a cross-sectional area of a cool spot cooling passage in the cool spot to have a second cross-sectional area that is smaller than the first cross-sectional area, wherein altering the cross-sectional area of the cool spot cooling passage includes inserting a hollow member into the cool spot cooling passage, and coupling the hollow member into the cool spot cooling passage, wherein the hollow member defines a second exit opening in the exterior surface that has the second cross-sectional area, the hollow member has an inner end opposite the second exit opening, a third cross-sectional area at the inner end is larger than the second cross-sectional area and less than the first cross sectional area, and the cross-sectional area of the hollow member decreases gradually from the inner end to the second exit opening.

2. The method of claim 1, wherein the cool spot cooling passage includes a first group of the plurality of cooling passages, and altering the cross-sectional area of the cool spot cooling passage includes altering the cross-sectional area of each cool spot cooling passage of the first group according to a pattern.

3. The method of claim 1, wherein identifying the hot spot includes measuring the first parameter of the component after operation of the turbine system.

4. The method of claim 1, wherein identifying the cool spot includes using a cooling profile of the component.

5. The method of claim 4, wherein the cooling profile is based at least in part on flow of coolant through the plurality of cooling passages.

6. The method of claim 1, wherein identifying the cool spot includes identifying a cool spot cooling passage that has excess cooling capacity.

7. A method, comprising:

identifying a first region of an exterior surface of a body of a component of a turbine system, wherein the first region requires more cooling than the first region currently receives, the first region including a first cooling passage of a plurality of cooling passages defined in a body of the component and extending to an exterior surface thereof, each cooling passage of the plurality of cooling passages having a first cross-sectional area and a first exit opening, and the first cooling passage requiring more cooling than the first cooling passage currently receives;

identifying a second region of the exterior surface including a second cooling passage of the plurality of cooling passages that receives more cooling than the second cooling passage currently requires; and reconfiguring one or more of the cooling passage to direct a portion of a coolant from the second cooling passage to the first cooling passage, wherein the reconfiguring includes reducing a cross-sectional area of one or more of the second cooling passage, and wherein reducing a cross-sectional area of the second cooling passage includes inserting a hollow member into the second cooling passage, the hollow member extending to the exterior surface of the body and defining a second exit opening therein, the second exit opening in the hollow member having a second cross-sectional area that is less than the first cross-sectional area, the hollow member has an inner end opposite the second exit opening, a third cross-sectional area at the inner end is larger than the second cross-sectional area and less than the first cross sectional area, and the cross-sectional area of the hollow member decreases gradually from the third cross-sectional area at the inner end to the second cross-sectional area at the second exit opening.

8. The method of claim 7, wherein identifying the first region includes using a cooling profile of the component.

9. The method of claim 8, wherein using a cooling profile of the component includes creating a cooling profile of the component.

10. The method of claim 8, wherein the cooling profile is based on a parameter of the exterior surface after use of the component in the turbine system.

11. The method of claim 10, wherein the parameter is oxidation of the exterior surface.

12. The method of claim 10, wherein the parameter is creep.

13. The method of claim 10, wherein the parameter is measured.

14. The method of claim 10, wherein the parameter is predicted based on a digital model of the component.

15. The method of claim 8, wherein the cooling profile is based on flow of a coolant through the plurality of cooling passages.

* * * * *